(12) United States Patent
Tjader

(10) Patent No.: US 10,378,688 B2
(45) Date of Patent: Aug. 13, 2019

(54) METHOD AND DEVICE FOR HOLDING AND RELEASING A CABLE IN A PIPE SPLITTER

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 15/599,925

(22) Filed: May 19, 2017

(65) Prior Publication Data

US 2017/0321838 A1 Nov. 9, 2017

Related U.S. Application Data

(63) Continuation of application No. 15/225,229, filed on Aug. 1, 2016, now Pat. No. 8,664,328, which is a
(Continued)

(51) Int. Cl.
*F16L 55/18* (2006.01)
*E21B 7/20* (2006.01)
(Continued)

(52) U.S. Cl.
CPC ............. *F16L 55/18* (2013.01); *E21B 7/205* (2013.01); *E21B 7/30* (2013.01); *F16G 11/00* (2013.01);
(Continued)

(58) Field of Classification Search
USPC .................. 405/154.1, 184.1, 184.3, 184.4
See application file for complete search history.

(56) References Cited

U.S. PATENT DOCUMENTS 2,098,915 A 11/1937 Foukal
8,414,225 B2 4/2013 Tjader
(Continued)

FOREIGN PATENT DOCUMENTS

WO WO 95/21347 * 8/1995

OTHER PUBLICATIONS

"U.S. Appl. No. 12/686,229, Ex Parte Quayle Action dated Sep. 20, 2012", 5 pgs.
(Continued)

*Primary Examiner* — Sean D Andrish
(74) *Attorney, Agent, or Firm* — Schwegman Lundberg & Woessner, P.A.

(57) ABSTRACT

A cable retention and release mechanism includes a cable gripping device including a cable passage. A cable extends through the cable passage. A cable gripping device collar is movably coupled around the cable gripping device. An outer cable gripping device surface is seated against a cable gripping device receiving inner surface preventing movement of the cable gripping device relative to the cable gripping device collar. The cable gripping device receiving inner surface clamps the cable gripping device on the cable and prevents sliding movement of the cable. A jack is movably coupled with the cable gripping device collar. In a first engaged position the jack is engaged against the cable gripping device proximal end. In a second engaged position the jack unseats the outer cable gripping device surface from the cable gripping device receiving inner surface and releases the clamping of the cable.

9 Claims, 11 Drawing Sheets

Related U.S. Application Data continuation of application No. 14/309,345, filed on Jun. 19, 2014, now Pat. No. 9,404,614, which is a continuation of application No. 13/857,251, filed on Apr. 5, 2013, now Pat. No. 8,784,009, which is a continuation of application No. 12/686,229, filed on Jan. 12, 2010, now Pat. No. 8,414,224.

(60) Provisional application No. 61/144,064, filed on Jan. 12, 2009.

(51) Int. Cl.
| | | |
|---|---|---|
| *E21B 7/30* | (2006.01) | |
| *F16G 11/00* | (2006.01) | |
| *F16G 11/04* | (2006.01) | |
| *F16L 1/06* | (2006.01) | |
| *F16L 55/165* | (2006.01) | |

(52) U.S. Cl.
CPC ............ *F16G 11/04* (2013.01); *F16G 11/048* (2013.01); *F16L 1/06* (2013.01); *F16L 55/1658* (2013.01); *Y10T 24/39* (2015.01); *Y10T 24/3978* (2015.01); *Y10T 29/49822* (2015.01); *Y10T 403/16* (2015.01); *Y10T 403/1641* (2015.01)

(56) References Cited

U.S. PATENT DOCUMENTS

| | | |
|---|---|---|
| 8,784,009 B2 | 7/2014 | Tjader |
| 9,404,614 B2 | 8/2016 | Tjader |
| 9,664,328 B2 | 5/2017 | Tjader |
| 2004/0265067 A1 | 12/2004 | Putnam |
| 2007/0048091 A1 | 3/2007 | Tjader |
| 2010/0178113 A1 | 7/2010 | Tjader |
| 2013/0219670 A1 | 8/2013 | Tjader |
| 2014/0298622 A1 | 10/2014 | Tjader |
| 2016/0341349 A1 | 11/2016 | Tjader |

OTHER PUBLICATIONS

"U.S. Appl. No. 12/686,229, Non Final Office Action dated May 10, 2012", 11 pgs.
"U.S. Appl. No. 12/686,229, Notice of Allowance dated Dec. 10, 2012", 5 pgs.
"U.S. Appl. No. 12/686,229, Response filed Aug. 6, 2012 to Non Final Office Action dated May 10, 2012", 22 pgs.
"U.S. Appl. No. 13/857,251 , Response filed Jan. 3, 2014 to Non Final Office Action dated Oct. 30, 2013", 10 pgs.
"U.S. Appl. No. 13/857,251, Non Final Office Action dated May 31, 2013", 8 pgs.
"U.S. Appl. No. 13/857,251, Non Final Office Action dated Oct. 30, 2013", 7 pgs.
"U.S. Appl. No. 13/857,251, Notice of Allowance dated Mar. 12, 2014", 8 pgs.
"U.S. Appl. No. 14/309,345, Advisory Action dated Jan. 25, 2016", 1 pg.
"U.S. Appl. No. 14/309,345, Final Office Action dated Jan. 25, 2016", 7 pgs.
"U.S. Appl. No. 14/309,345, Final Office Action dated Nov. 13, 2015", 10 pgs.
"U.S. Appl. No. 14/309,345, Non Final Office Action dated Jun. 12, 2015", 12 pgs.
"U.S. Appl. No. 14/309,345, Notice of Allowance dated Apr. 12, 2016", 5 pgs.
"U.S. Appl. No. 14/309,345, Preliminary Amendment filed Sep. 9, 2014", 5 pgs.
"U.S. Appl. No. 14/309,345, Response filed Sep. 29, 2015 to Non Final Office Action dated Jun. 12, 2015", 11 pgs.
"U.S. Appl. No. 15/225, Preliminary Amendment filed Aug. 2, 2016", 5 pgs.
"U.S. Appl. No. 15/225,229, Non Final Office Action dated Sep. 6, 2016", 8 pgs.
"U.S. Appl. No. 15/225,229, Notice of Allowance dated Jan. 27, 2017", 5 pgs.
"U.S. Appl. No. 15/225,229, Reponse filed Dec. 6, 2016 to Non-Final Office Action dated Sep. 6, 2016", 10 pgs.
"U.S. Appl. No. 14/309,345 Response filed Jan. 13, 2016 to Final Office Action dated Nov. 13, 2015", 9 pgs.
"U.S. Appl. No. 14/309,345, Response filed Mar. 25, 2016 to Final Office Action dated Jan. 25, 2016", 5 pgs.

\* cited by examiner

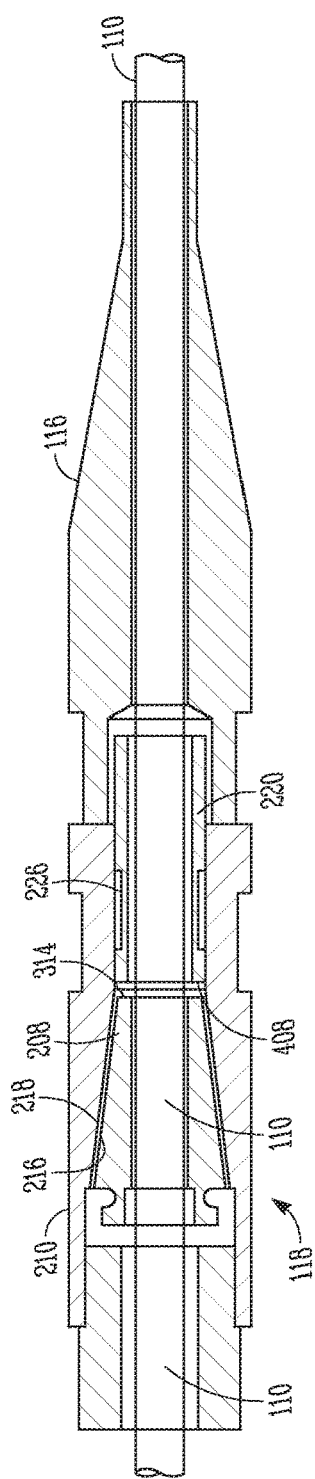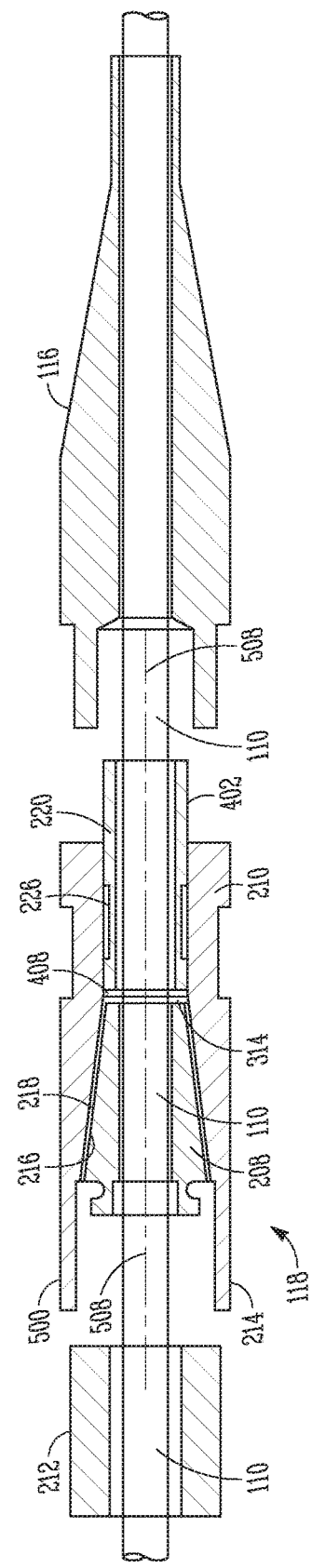

METHOD AND DEVICE FOR HOLDING AND RELEASING A CABLE IN A PIPE SPLITTER

RELATED APPLICATIONS

This application is a continuation of U.S. patent application Ser. No. 15/225,229, filed on Aug. 1, 2016, which is a continuation of U.S. patent application Ser. No. 14/309,345, filed on Jun. 19, 2014, which is a continuation of U.S. patent application Ser. No. 13/857,251, filed on Apr. 5, 2013, which is a continuation of U.S. patent application Ser. No. 12/686,229, filed on Jan. 12, 2010, which claims the benefit of U.S. Provisional Patent Application Ser. No. 61/144,064, filed Jan. 12, 2009, the benefit of priority of each of which is claimed hereby, and each of which is incorporated by reference herein in its entirety.

TECHNICAL FIELD

This invention relates to devices and methods for pulling a flexible line. Specifically, this invention relates to cable pulling devices, methods, and accessories for pipe replacement.

BACKGROUND

Pipe, such as plastic, copper, lead pipe and the like, has been used for connecting homes and creating networks for utilities, for instance, water, sewage and natural gas. As pipes become older, they break down, crack, develop scaling on interior surfaces that can clog the pipe, etc. and thereby require replacement.

A technique know as pipe bursting is currently used as a convenient method to replace underground pipe without the need to completely dig up the pipe to be replaced. A pipe breaking device, such as an expander or a mole, is pulled by a cable on a motorized spool through the existing pipe while it is still underground. The expander is designed to break, split or burst the pipe, and at the same time to push the old pipe into the surrounding soil. The expansion of the old pipe allows the expander to pull a replacement pipe into place.

After use, the pipe breaking device may be decoupled from the cable to allow threading of the cable through another existing pipe or to store the cable on the spool until needed in the future. The cable pulling the pipe breaking device is often tightly coupled with the cable due to the pulling forces of the motorized spool. Because of the flexible nature of the cable it can be very difficult to decouple the cable from the pipe splitter.

BRIEF DESCRIPTION OF THE DRAWINGS

FIG. 6 Is a cross-sectional view of the pipe splitting assembly including one example of a cable locking assembly where the cable gripping device is locked with the cable gripping device collar and immobilizes the cable relative to the pipe splitting assembly.

FIG. 7 Is a cross-sectional view of the pipe splitting assembly including one example of a cable locking assembly where the cable gripping device is disengaged from the cable gripping device collar by distal movement of the jack.

DETAILED DESCRIPTION

Figure 1A:
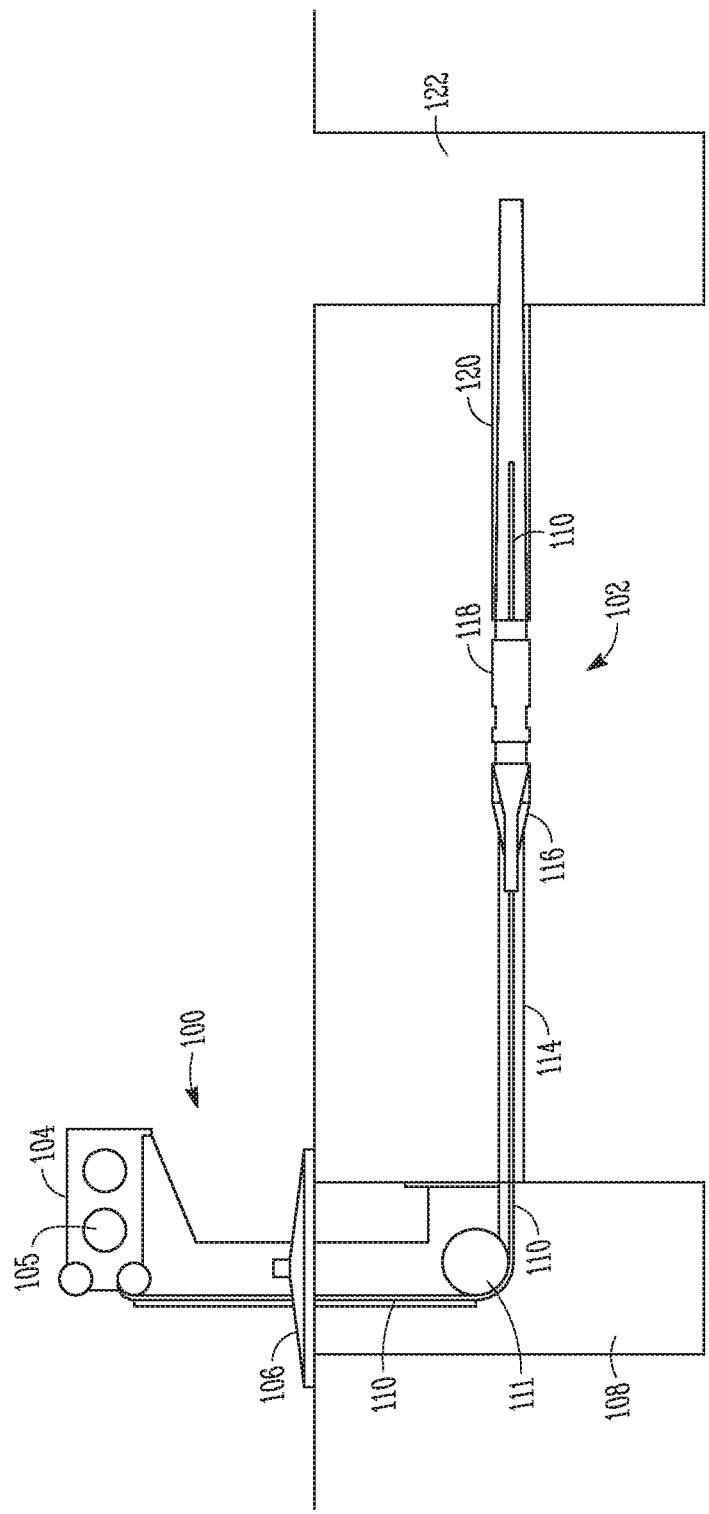
FIG. 1A Is a side view of one example of an above-ground pipe bursting and pulling system using a portable motorized puller.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

Figure 1B:
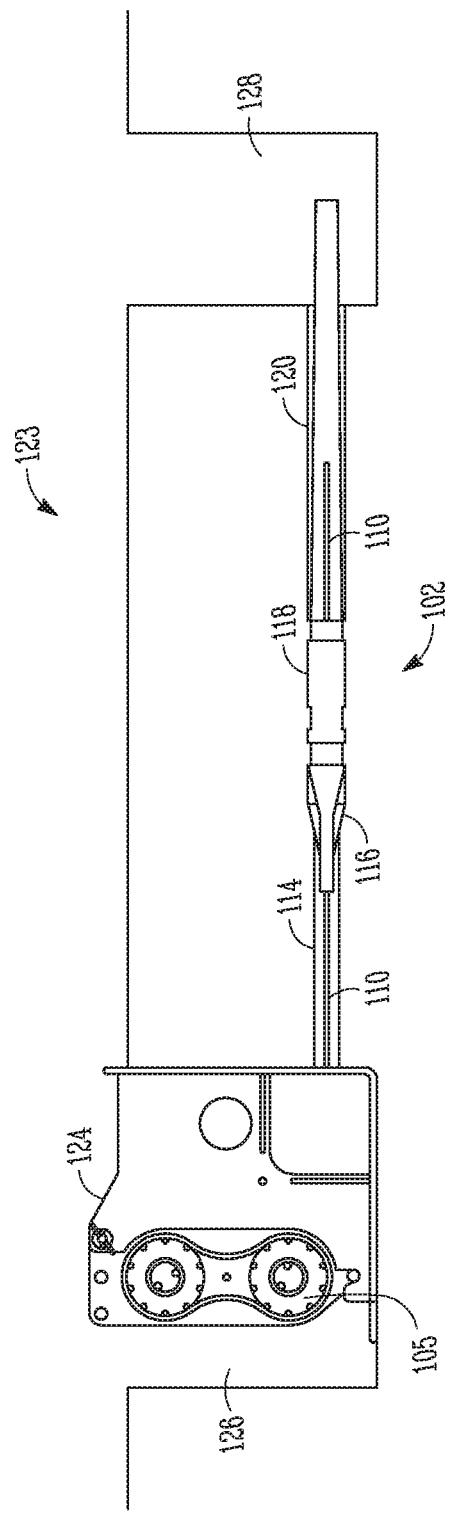
FIG. 1B Is a side view of one example of an in-ground pipe bursting and pulling system using a portable motorized puller.

FIGS. 1A, 1B show two examples of pulling systems 100, 123. As shown in FIGS. 1A, 1B the pulling systems 100, 123 include pullers 105, 124 and pipe splitting assemblies 102. Referring now to FIG. 1A, the puller 105 includes a base 106 configured to lie over a first trench 108. In one example, the puller 105 includes, but is not limited to, a dual cap stand puller, a cylindrical puller and the like. A flexible element, for instance cable 110, extends from the puller 105 and into the first trench 108 over an idler roller 111. The cable 110 extends into an existing pipe 114. As shown in FIG. 1A, the cable 110 is threaded through the pipe splitting assembly 102 including a pipe splitter 116 and a cable holding and releasing mechanism, such as cable locking assembly 118. The pipe splitting assembly 102 is coupled with the cable 110 and pulling forces from the puller 105 are thereby transmitted from the cable 110 to the pipe splitting assembly 102. The pipe splitter 116 engages against the existing pipe 114 to split the existing pipe and an expanding surface (e.g., frustoconical surface) in the pipe splitter 116 pushes the broken existing pipe 114 into the surrounding soil. As shown in FIG. 1A, in one example the cable locking assembly 118 includes a coupling to connect with a replacement pipe 120. As the pipe splitting assembly 102 is drawn through the existing pipe 114 the replacement pipe 120 is correspondingly drawn after the pipe splitting assembly 102 and positioned in the original position of the existing pipe 114.

Referring again to FIG. 1A, a second trench 122 is shown. The cable 110 prior to operation of the pipe splitting assembly is threaded through the existing pipe 114 to the second trench 122. In the second trench 122 the pipe splitting assembly 102 is coupled around the cable 110. Additionally, the replacement pipe 120, if included with the pipe splitting assembly 102, is coupled with the pipe splitting assembly 102. Operation of the puller 104 pulls the pipe splitting assembly 102 as described above. The pipe splitting assembly 102 is drawn from the second trench 122 towards the first trench 108 to break the existing pipe 114 therebetween and position the replacement pipe 120.

Referring now to FIG. 1B, another example of a puller 124 is shown positioned at a first trench 126. Puller 124, in this example, is configured for placement within the first trench 126 as opposed to placement above the trench 108, as shown in FIG. 1A. In both examples, the pullers 104, 124 are configured as compact mobile units that are positioned above or within the trenches 108, 126 by operators. Heavy equipment including hydraulic arms and the like is not needed for placement of the pullers 104, 124 prior to their use in the trenches 108, 126. Referring again to FIG. 1B, the pulling system 123 operates in much the same manner as the pulling system 100 shown in FIG. 1A. The cable 110 is threaded through the existing pipe 114 to the second trench 128. The cable 110 is coupled with the pipe splitting assembly 102 including the pipe splitter 116 and cable locking assembly 118. The pipe splitting assembly 102 is then drawn through the existing pipe 114 where the pipe splitter 116 engages against the existing pipe 114 breaking the existing pipe and expanding it outward into the surrounding soil. As described above, in one example, the cable locking assembly 118 is coupled with a replacement pipe 120. The replacement pipe 120 is pulled behind the pipe splitting assembly 102 during operation of the puller 124 to position the replacement pipe in place of the existing pipe 114. The pullers 104, 124 are thereby able to break and expand an existing pipe 114 and at the same time pull through and position the replacement pipe 120.

Figure 2A:
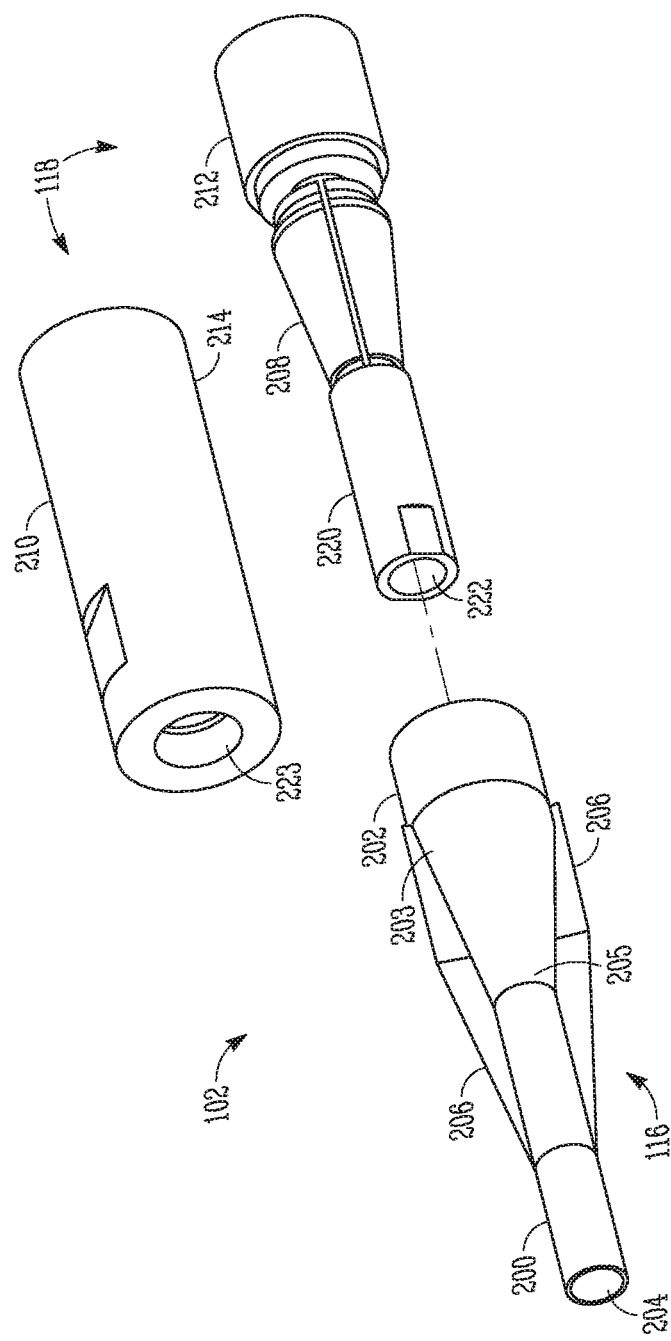
FIG. 2A Is a perspective view of one example of a pipe splitting assembly including a cable locking assembly.
Figure 2B:
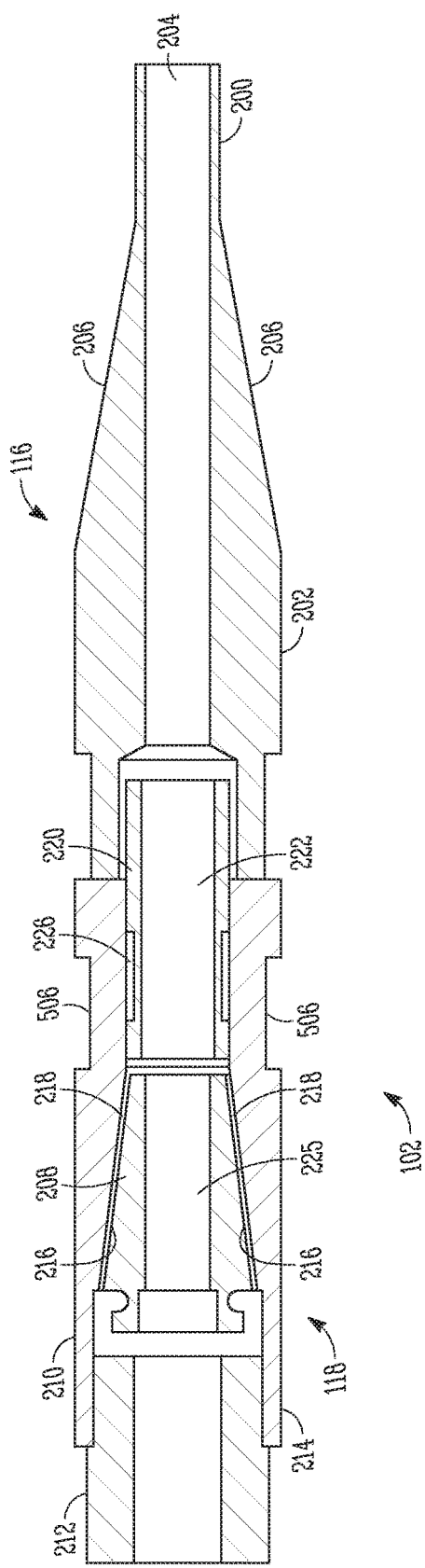
FIG. 2B Is a cross-sectional view of the pipe splitting assembly shown in FIG. 2A.

Referring now to FIG. 2A an exploded view of the pipe splitting assembly 102 is shown. As discussed above, the pipe splitting assembly 102 includes a pipe splitter 116 and cable locking assembly 118. The pipe splitter 116 includes a cable passage 204. The cable passage 204 is sized and shaped to receive a cable, such as cable 110 shown in FIGS. 1A, 1B. Referring to FIG. 2B, the cable passage 204 extends from the pipe splitter proximal end 200 toward the pipe splitter distal end 202. The pipe splitter 116 includes at least one cutting surface 206 configured to engage against an existing pipe, such as existing pipe 114, and break the existing pipe. As shown in FIG. 2A, the example pipe splitter 116 includes two cutting surfaces 206 disposed on opposing sides of the pipe splitter 116. In another example, the pipe splitter 116 includes a plurality of cutting surfaces such as three or more cutting surfaces 206. The pipe splitter distal end 202, as shown in FIGS. 2A, 2B, includes an expanding surface 203 having a taper from the distal end 202 towards an intermediate portion 205 between the pipe splitter distal end 202 and the pipe splitter proximal end 200. The expanding surface 203 engages against broken existing pipe 114 (see FIGS. 1A, 1B) and pushes the broken existing pipe into the surrounding soil. Expansion through the expansion surface 203 provides space for the cable locking assembly 118 and pipe puller 212 as well as replacement pipe 120 to be drawn through the space and position the replacement pipe 120.

Referring again to FIGS. 2A, 2B, the cable locking assembly 118 includes a cable gripping device collar 210, a cable gripping device 208 and a jack 220. The cable gripping device collar 210 in one example includes a jack receiving inner surface 223 as shown in FIG. 2A. In another example, the cable gripping device collar 210 includes a cable gripping device receiving inner surface 218 as shown in FIG. 2B. As shown in FIG. 2B, the jack 220 is placed within the cable gripping device collar 210 as is the cable gripping device 208. When the cable locking assembly 118 is assembled the jack 220 is positioned along the jack receiving inner surface 223 as shown in FIG. 2B, and the cable gripping device 208 is positioned within the cable gripping device receiving inner surface 218. As shown in FIG. 2B, the jack 220 includes a jack cable passage 222 and the cable gripping device 208 includes a cable gripping device cable passage 225. Both of the cable passages 222, 225 are sized and shaped to receive the cable (e.g., cable 110 shown in FIGS. 1A, 1B). As will be described in further detail below, the cable gripping device 208 includes a cable gripping device outer surface 216. When the cable gripping device outer surface 216 engages against the cable gripping device receiving inner surface 218 of the cable gripping device collar 210 the cable gripping device 208 is forced to clamped around the cable, such as cable 110, and the cable gripping device 208 immobilizes the cable relative to the cable locking assembly 118. Conversely, disengagement of the cable gripping device 208 from the cable gripping device collar 210 releases engagement of the cable from the cable gripping device 208 thereby allowing sliding movement of the cable relative to the cable gripping device 208 and cable gripping device collar 210. As will be described in further detail below, the jack 220 is movable along the jack inner surface 223 of the cable gripping device collar 210 towards the cable gripping device 208. Engagement of the jack 220 with the cable gripping device 208 when the cable gripping device is locked with the cable gripping device receiving inner surface 218 of the cable gripping device collar 210 pushes the cable gripping device 208 out of engagement with the cable gripping device collar 210 thereby releasing engagement with the cable.

Optionally, the cable locking assembly 118 includes a pipe puller 212. The pipe puller 212 is configured for coupling with a replacement pipe, such as replacement pipe 120 shown in FIGS. 1A, 1B. In one example, the pipe puller 212 is coupled with a pipe puller flange 214 of the cable gripping device collar 210. For instance, the pipe puller 212 is coupled with the cable gripping device collar 210 with a fastener system including, but not limited to, threading, pins, mechanical fittings and the like.

When the pipe splitting assembly 102 is assembled as shown in FIG. 2B with the cable gripping device 208 engaged against the cable gripping device receiving inner surface 218 of the cable gripping device collar 210 the cable is clamped by the cable gripping device 208 and thereby prevented from sliding relative to the pipe splitting assembly 102. Pulling forces transmitted through the cable are transmitted through the cable gripping device 208 to the cable gripping device collar 210. As shown in FIG. 2B, the pipe splitter distal end 202 is coupled with the cable gripping device collar 210. When pulled, the cable gripping device collar 210 thereby pushes the pipe splitter 116 forward, as shown in FIGS. 1A, 1B. The pipe splitter 116 is engaged against the existing pipe 114 to break and expand the existing pipe into the surrounding soil creating sufficient space for pulling of the pipe splitting assembly 102 and, in one example, pulling of a replacement pipe 120.

Figure 3:
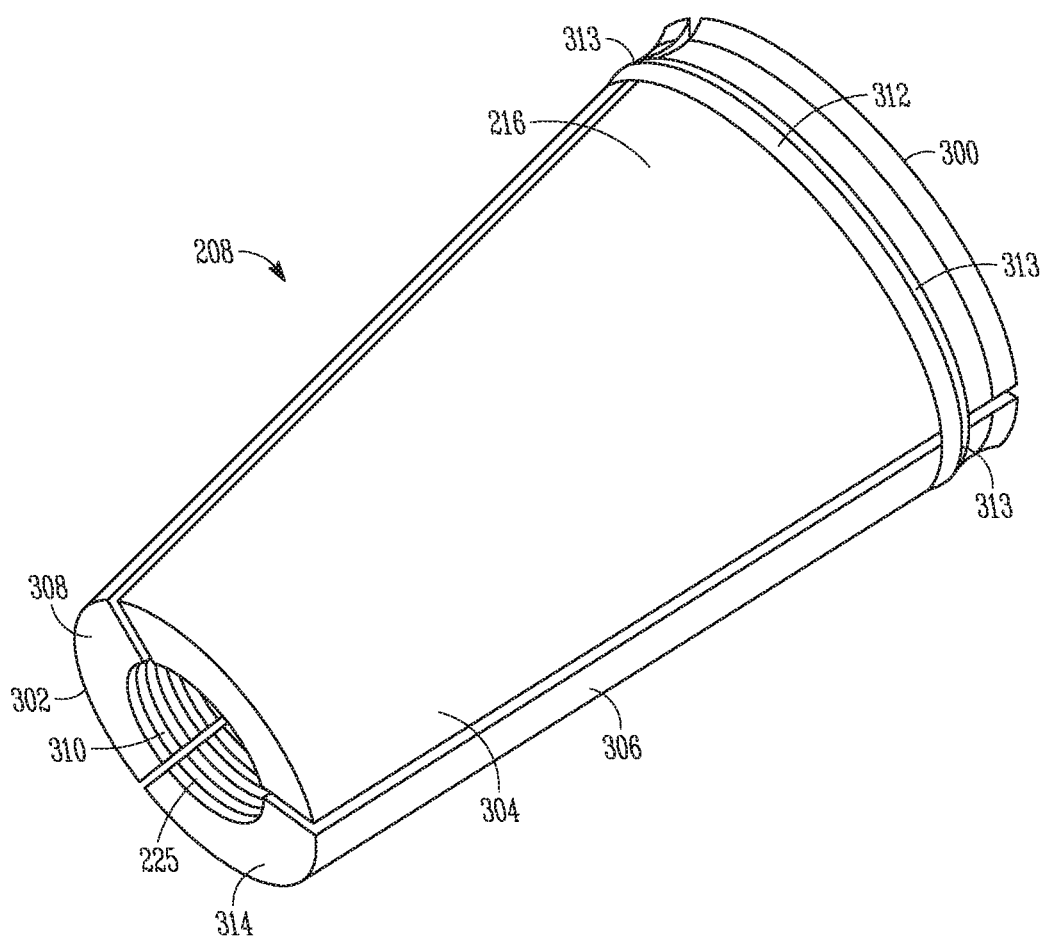
FIG. 3 Is a perspective view of one example of a cable gripping device.

One example of a cable gripping device 208 is shown in FIG. 3. The cable gripping device 208 includes a proximal end 302 and a distal end 300. In one example the cable gripping device 208 includes a plurality of cable gripping device pieces. For instance, the cable gripping device 208 includes two cable gripping device pieces. In the example shown in FIG. 3, the cable gripping device 208 includes three cable gripping device pieces 304, 306, 308. The exterior of the cable gripping device pieces 304, 306, 308 forms the outer cable gripping device surface 216. As shown in FIG. 3, the outer cable gripping device surface 216 tapers from the distal end 300 toward the proximal end 302. Referring again to FIG. 2B, the cable gripping device outer surface 216 has a corresponding shape to the cable gripping device receiving inner surface 218 of the cable gripping device collar 210. The corresponding shapes of surfaces 216, 218 allows for a tight engagement between the cable gripping device 208 and the cable gripping device collar 210. As the cable (e.g., cable 110) shown in FIGS. 1A, 1B is drawn by a puller, the cable gripping device 208 which is clamped around the cable is pulled into closer engagement with the cable gripping device collar 210. The corresponding cable gripping device outer surface 216 and cable gripping device receiving the inner surface 218 are thereby tightly engaged. The tight engagement deforms at least one of the cable gripping device 208 and the cable gripping device receiving inner surface 218 forming a tight interference fit between the cable gripping device 208 and cable gripping device collar 210. The interference fit between the cable gripping device 208 and cable gripping device collar 210 ensures that the cable is tightly clamped by the cable gripping device 208 throughout operation of the pulling system 100 shown in FIGS. 1A, 1B. Referring again to FIG. 3, in one example, the cable gripping device 208 includes frictional surface 310 along the cable gripping device cable passage 225. The frictional surfaces 310 tightly grasp the cable when the cable gripping device 208 is clamped around the cable because of tight engagement with the cable gripping device collar 210 (see FIGS. 2A, 2B).

Figure 4:
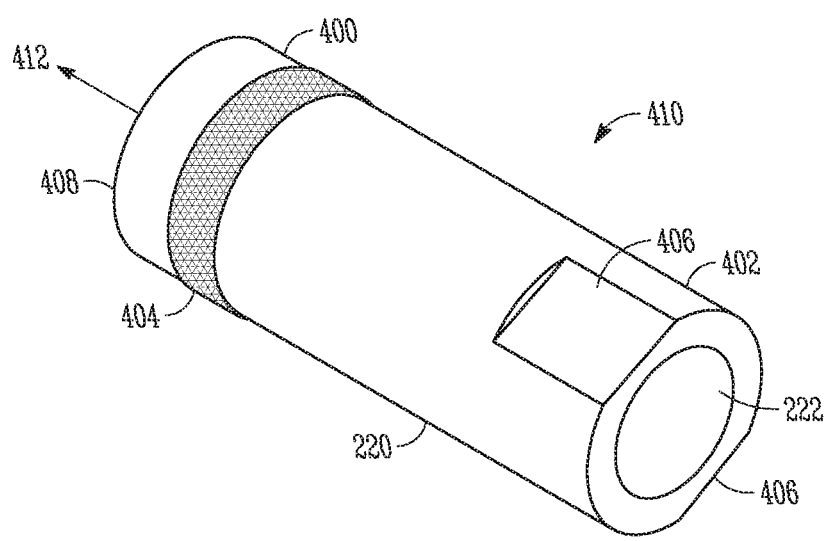
FIG. 4 Is a perspective view of one example of a jack.

The jack 220 is shown in FIG. 4. The jack 220 extends between a jack distal end 400 and a jack proximal end 402. As previously described, the jack 220 includes a jack cable passage 222. The jack cable passage 222 allows for slidable movement of the cable 110 shown in FIGS. 1A, 1B relative to the jack 220. The jack 220 further includes a coupling feature 404. As shown in FIG. 4, in one example, the coupling feature 404 extends around the perimeter of the jack 220. The coupling feature 404 includes, but is not limited to, a threaded surface, a geared surface such as a helical gear surface, a rack surface, and the like. As described further below, the coupling feature 404 allows the jack 220 to movably couple with the cable gripping device collar 210. Movement such as a rotational movement applied to one of the jack 220 or cable gripping device collar 210 moves the jack 220 relative to the cable gripping device collar 210 toward the cable gripping device 208. Movement of the jack 220 engages a cable gripping device engagement surface 408 of the jack 220 against the cable gripping device 208 (see FIGS. 2A, 2B). Movement of the jack 220 relative to the cable gripping device collar 210 moves the jack 220 (when engaged with the cable gripping device 208) as a single unit with the cable gripping device 208. The force applied to the cable gripping device 208 by the jack 220 overcomes the forces seating the cable gripping device 208 with the cable gripping device receiving inner surface 218 of the cable gripping device collar 210. The interference fit between the cable gripping device 208 and cable gripping device collar 210 is thereby broken by movement of the jack 220 acting upon the cable gripping device 208.

The jack 220 includes, in another example, a tool receiving surface 406. As shown in FIG. 4, the example jack 220 includes dual tool receiving surfaces 406 on opposed sides of the jack 220. The tool receiving surfaces 406 optionally receive tools such as a wrench, rachet, hand tools and the like. The tools are rotated to rotate the jack 220 relative to the cable gripping device collar 210.

Figure 5:
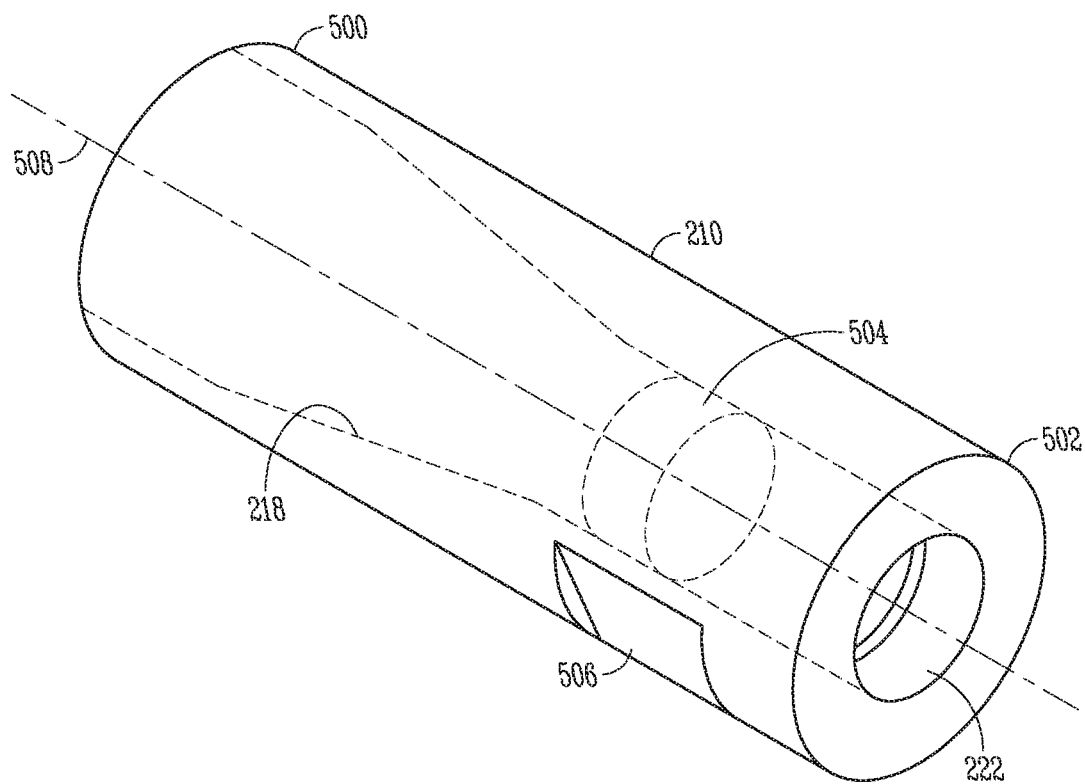
FIG. 5 is a perspective view of one example of a cable gripping device collar.

Referring now to FIG. 5, the cable gripping device collar 210 is shown. The cable gripping device collar 210 extends between a cable gripping device collar proximal end 502 and a cable gripping device collar distal end 500. As previously described, the cable gripping device collar 210 includes a jack receiving inner surface 223 and a cable gripping device receiving inner surface 218. The jack receiving surface 223 is sized and shaped to receive the jack 220 shown in FIG. 4.

Referring again to FIG. 5, the cable gripping device collar 210 includes a coupling feature 504 extending at least part way around the jack receiving inner surface 223. The coupling features 404, 504 of the jack 220 and cable gripping device collar 210 couple together to form a mechanical advantage coupling 226 as shown in FIG. 2B. Coupling feature 504 includes, but is not limited to, a threading surface having a corresponding fit to threading of one example of the coupling feature 404, a geared surface, a rack surface and the like for engagement with the coupling feature 404 shown with the jack 220 in FIG. 4. The coupling features 404, 504 are engaged with each other so that force input 410 applied to at least one of the jack 220 and the cable gripping device collar 210 results in translational movement of the jack 220 along the cable gripping device collar longitudinal axis 508 toward the cable gripping device 208. Further, engagement between the coupling features 404, 504 at the mechanical advantage coupling 226 is configured to provide a force output 412 at the cable gripping device engaging surface 408 of the jack 220 that is greater than the force input 410, as described below.

The cable gripping device receiving surface 218, as previously shown in FIG. 2B, includes a taper extending from the cable gripping device collar distal end 500 toward the cable gripping device collar proximal end 502. As described above, the cable gripping device receiving inner surface 218, in one example, has a corresponding geometry to the cable gripping device outer surface 216 of the cable gripping device 208. When the cable gripping device 208 is fit within the cable gripping device collar 210 and drawn proximally toward the cable gripping device collar proximal end 502 the cable gripping device 208 tightly engages with the cable gripping device receiving inner surface 218. At least one of the cable gripping device receiving surface 218 and the cable gripping device outer surface 208 deforms and forms an interference fit between the cable gripping device 208 and cable gripping device collar 210. As described above, this interference fit tightly engages the cable gripping device 208 around the cable (e.g., cable 110 shown in FIGS. 1A, 1B), thereby preventing movement of the cable relative to the cable locking assembly 118. Pulling forces from the cable 110 transmit through the cable locking assembly 118 to the pipe splitter 116 shown in FIGS. 2A, 2B, allowing movement of the pipe splitting assembly 102 relative to an existing pipe 114. The pulling forces move the pipe splitter 116 into engagement with the existing pipe 114 to break the existing pipe and force the existing pipe into the surrounding soil to make room for the pipe splitting assembly 102 and the replacement pipe 120.

Referring again to FIG. 4 and FIG. 5, the coupling features 404 and 504 of the jack 220 and cable gripping device collar 210, respectively form the mechanical advantage coupling 226 shown in FIG. 2B. The mechanical advantage coupling 226 allows for a force input such as force input 410 shown in FIG. 4. To move the jack 220 relative to the cable gripping device collar 210 along a cable gripping device collar longitudinal axis 508. Movement of the jack 220 along the cable gripping device collar longitudinal axis 508 produces a longitudinal force output 412 at the jack engaging surface 408. When the jack 220 is engaged with the cable gripping device 208 at the jack engaging surface 408 the force output 412 moves the cable gripping device 208 out of engagement with the cable gripping device receiving inner surface 218 of the cable gripping device collar 210. Because of the mechanical advantage coupling 226 between the jack 220 and the cable gripping device collar 210 the force input 410 to the jack 220 is multiplied resulting in the force output 412 at the cable gripping device engaging surface 408. A user is thereby able to provide a force input 410 (e.g., through a hand tool such as a wrench) that is multiplied to produce the force output 412 at the cable gripping device engaging surface. The force output 412 is greater than the force input 410. The increased force output 412 is able to break the locking engagement between the cable gripping device 208 and the cable gripping device collar 210. As shown in FIG. 5, in one example the cable gripping device collar 210 includes at least one tool receiving surface 506. As shown in FIG. 2B, in another example, the cable gripping device collar 210 includes dual tool receiving surfaces 506.

Where the user wishes to move the jack 220 relative to the cable gripping device collar 210 the user engages a first tool such as a wrench around the jack at the tool receiving surfaces 406. The user then engages a second tool around the cable gripping device collar 210 at the tool receiving surfaces 506 of the cable gripping device collar. The jack 220 is rotated relative to the cable gripping device collar 210 with the tool engaged at the tool receiving services 406. The cable gripping device collar is held immobile with a tool engaged at the tool receiving surfaces 506 of the cable gripping device collar 210. Rotation of the jack 220 applies the force input 410 to the jack 220. Movement of the jack 220 along the cable gripping device collar 210 applies the force output 412 through the cable gripping device engaging surface 408 to the cable gripping device 208 where the jack 220 is engaged (through longitudinal movement along the cable gripping device collar 210) cable gripping device 208. The user is thereby able to rotate the jack 220 relative to the cable gripping device collar 210 with hand tools to apply a sufficient force output 412 greater than the force input 410 to disengage the cable gripping device 208 from the cable gripping device collar 210 breaking the interference fit between the cable gripping device 208 and the cable gripping device collar 210. In one example, at least the jack 220 and cable gripping device collar 210 are formed with materials having sufficient strength to receive the force input 410 and transmit the force output 412 to the collar 208. Materials of the jack 220 and cable gripping device collar 210 include, but are not limited to, carbon steels, alloy steels and the like.

FIGS. 6 and 7 show examples of the pipe splitting assembly 102 and cable locking assembly 118. In FIG. 6, the cable gripping device 208 is in a first interference fit orientation and in FIG. 7 the cable gripping device 208 is in a second disengaged orientation where the interference fit between the cable gripping device 208 and cable gripping device collar 210 is broken and the cable 110 is free to slide relative to the cable gripping device 208, collect collar 210 and jack 220.

Referring first to FIG. 6, the pipe splitting assembly 102 is shown in an assembled state where the cable gripping device 208 is clamped around the cable 110. As previously described, when the cable gripping device 208 is clamped around the cable 110 the cable gripping device outer surface 216 is interference fit with a cable gripping device receiving inner surface 218 of the cable gripping device collar 210. At least one of the cable gripping device collar 210 and cable gripping device 208 are deformed in this first interference fit orientation to compress the cable gripping device 208 around the cable 110 so that the cable gripping device 208 (e.g., cable gripping device pieces 304, 306, 308 shown in FIG. 3) engages around the cable 110 to hold the cable immobile relative to the cable gripping device 208 and cable gripping device collar 210. The jack 220 in FIG. 6 is shown in a first engaged orientation where a surface of the jack 220 such as the cable gripping device engaging surface 408, shown in FIG. 4, is engaged with the cable gripping device 208 (e.g., jack receiving surface 314).

In this first engaged orientation the jack 220 provides no force or an incidental force to the cable gripping device 208. In another example, shown in FIG. 2B, the cable gripping device 208 is not engaged with the jack 220 (i.e., there is a gap between the jack 220 and the cable gripping device 208). Additionally, as shown in FIG. 6, the pipe splitter 116 is coupled around the cable 110 and engaged with the cable gripping device collar 210. Because the cable gripping device collar 208 is clamped around the cable 110 pulling forces applied through the cable 110 to the cable locking assembly 118 are transmitted through the cable gripping device collar 210 to the pipe splitter 116. As previously described above, pulling forces transmitted through the cable 110 thereby pull the pipe splitter 116 through an existing pipe, such as existing pipe 114 shown in FIGS. 1A, 1B.

Referring now to FIG. 7, the cable locking assembly 118 is shown in a second disengaged orientation where the cable gripping device 208 is movable along the cable gripping device collar longitudinal axis 508. The interference fit between the cable gripping device 208 and the cable gripping device collar 210 has been broken thereby allowing sliding movement of the cable 110 relative to the cable gripping device 208 and cable gripping device collar 210. To access the jack 220 to break the interference fit between the cable gripping device 208 and cable gripping device collar 210 the pipe splitter 116 is slid proximally along the cable 110 thereby exposing the jack proximal end 402. In one example, the pipe puller 212 is disengaged from the pipe puller flange 214 at the cable gripping device collar distal end 500. When the jack 220 is operated to disengage the cable gripping device 208 from the cable gripping device collar 210, positioning the pipe puller 212 away from the cable gripping device collar 210 provides space for the cable gripping device 208 to move distally relative to the cable gripping device collar 210. In another example, the pipe puller 212 is coupled with the cable gripping device collar 210 when the jack 220 is moved along the cable gripping device collar longitudinal axis 508 to disengage the cable gripping device 208 from the cable gripping device collar 210.

In one example, once the pipe splitter 116 is slid away from the cable gripping device collar 210 to expose the jack proximal end 402 the jack 220 is rotated relative to the cable gripping device collar 210. In yet another example, the jack 220 is rotated relative to the cable gripping device collar 210 by application of a force input 410 through tool receiving services 406 near the jack proximal end 402 (see FIGS. 4 and 5). As previously described, the cable gripping device collar 210 is held immobile relative to the jack 220, for instance, with a tool coupled with the cable gripping device collar 210 at the tool receiving surfaces 506. As shown in FIGS. 6 and 7, the jack 220 is coupled to the cable gripping device collar 210 with a mechanical advantage coupling 226. Rotation of the jack 220, in one example, moves the jack 220 along the cable gripping device collar longitudinal axis 508 toward the cable gripping device 208. As previously, described the force input 410 is multiplied by the mechanical advantage coupling 226 resulting in a force output 412 (see FIG. 4) applied through the cable gripping device engaging surface 408 of the jack to the jack receiving surface 314 of the cable gripping device 208. The jack 220 and the cable gripping device 208 move together toward the cable gripping device collar distal end 500 along the cable gripping device collar longitudinal axis 508. The force output 412 of the jack 220 forces the cable gripping device 208 out of the interference fit with the cable gripping device collar 210 thereby breaking the interference fit and disengaging the cable gripping device outer surface 216 from the cable gripping device receiving inner surface 218 of the cable gripping device collar 210. Where the jack 220 is the second engaged position shown in FIG. 7 relative to the first engaged position shown in FIG. 6. The outer cable gripping device surface 216 is unseated from the cable gripping device receiving inner surface 218 thereby allowing the cable gripping device 208 to assume a non-compressed state and further allowing sliding movement of the cable 110 relative to the cable gripping device and the cable gripping device collar 210, as shown in FIG. 7. For example, in the non-compressed state the cable gripping device pieces 304, 306, 308 (FIG. 3) are only incidentally engaged with the cable 110 thereby allowing the cable 110 to slide relative to the cable gripping device 208, cable gripping device collar 210 and jack 220.

Once the cable gripping device 208 is disengaged from the cable 110, the pipe splitting assembly 102 is removed from the cable 110. For instance, the pipe puller 212 is slid off the cable 110 followed by removal of the cable gripping device 208, cable gripping device collar 210 and jack 220. The pipe splitter 116 is subsequently slid off of the cable 110 after removal of the cable locking assembly 118 and pipe puller 212. The cable locking assembly 118, as described, allows for the tight clamping of the cable 110 by the engagement of the cable gripping device 208 with the cable gripping device collar 210. The interference fit between the cable gripping device outer surface 216 and the cable gripping device receiving inner surface 218 creates a reliable clamping effect around the cable 110. The pulling forces are transmitted from the cable 110 to the pipe splitter 116 through the cable gripping device collar 210 engaged with the cable gripping device 208.

The cable locking assembly 118 further provides a convenient mechanism for disengaging the cable gripping device 208 from the cable gripping device collar 210. The mechanical advantage coupling 226 described above allows for force inputs, such as force input 410, to move the jack 220 relative to the cable gripping device collar 210. The force output 412 is greater than the force input 410 because of the mechanical advantage coupling 226, and the jack 220 engages with the cable gripping device 208 and moves the cable gripping device 208 by applying the force output 412 to the cable gripping device 208. The jack 220 thereby breaks the interference fit between the cable gripping device outer surface 216 and cable gripping device receiving inner surface 218 allowing for easy disassembly of the pipe splitting assembly 102. Despite the strong coupling between the cable gripping device 208 and the cable gripping device collar 210, in one example, a single user with a first tool coupled with the tool receiving surface 406 of the jack 220 and a second tool coupled with the tool receiving surface 506 of the cable gripping device collar 210 is able to rotate the jack 220 relative to the cable gripping device collar 210 to disengage the collar 208 from the cable gripping device collar 210. Difficult and time consuming processes such as hammering a cable locking mechanism to disengage a cable from a pipe splitting assembly and using power tools to disengage a cable from a pipe splitting assembly and the like are thereby avoided. Instead, the user is able to quickly and easily disengage the pipe splitting assembly from the cable 110 and rapidly disassemble the pipe splitting assembly 102 from the cable. In other examples the mechanical advantage coupling 226 includes, but is not limited to, gears such as mechanical advantage gear assemblies, gear and rack assemblies and the like where the force output, such as force output 412 is greater than the force input 410. The jack 220 is moved by the user relative to the cable gripping device collar 210 and engaged with the cable gripping device 208 to move the jack 220 and cable gripping device 208 together relative to the cable gripping device collar 210 to disengage the cable gripping device 208 from the cable gripping device collar.

Figure 8:
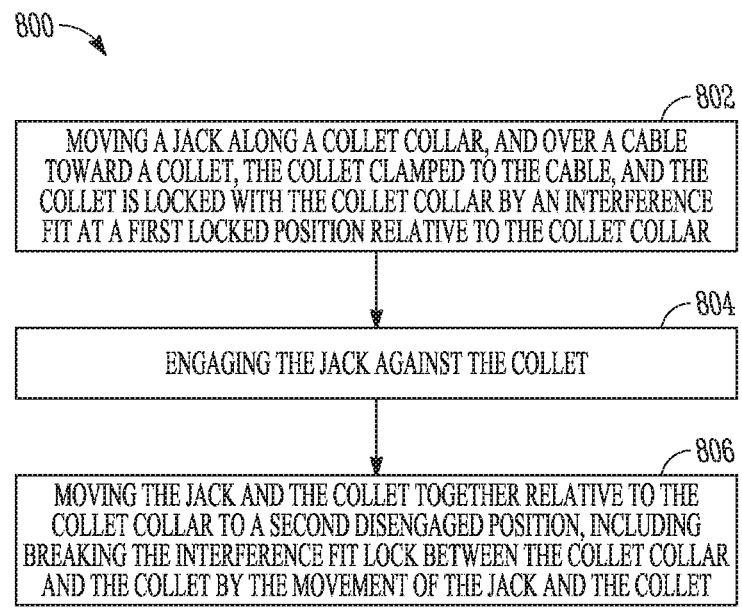
FIG. 8 Is a block diagram showing one example of a method of releasing the cable locking assembly.

Referring now to FIG. 8, one example of a method 800 for releasing a cable puller interference fit is shown. Where applicable, reference is made to various elements of the pipe splitting assembly 102 shown in FIGS. 1A through 7, including the cable locking assembly 118. At 802, a jack 220 is moved along a cable gripping device collar 210 and over a cable 110 toward a cable gripping device 208. The cable gripping device 208 is clamped to the cable 110 thereby immobilizing the cable gripping device 208 and cable gripping device collar 210 relative to the cable. The cable gripping device 208 is locked with the cable gripping device collar 210 by an interference at a first locked position relative to the cable gripping device collar 210. As described above, in one example, the cable gripping device outer surface 216 is interference fit with the cable gripping device receiving inner surface 218 of the cable gripping device collar 210. At 804, the jack 220 is engaged against the cable gripping device 208. For instance, in one example, a cable gripping device engaging surface 408 of the jack 220 is engaged with a jack receiving surface 314 of the cable gripping device 208. At 806, the jack 220 and the cable gripping device 208 are moved together relative to the cable gripping device collar 210 to a second disengaged position (e.g., see FIG. 7). Moving the jack and the cable gripping device relative to the cable gripping device collar 210 includes breaking the interference fit between the cable gripping device 208 and the cable gripping device collar 210. As described above, in one example, moving the jack 220 along the cable gripping device collar 210 includes moving the jack 220 relative to the cable gripping device collar 210 with a mechanical advantage coupling, such as the mechanical advantage coupling 226 shown in FIGS. 6 and 7. The mechanical advantage coupling 226 movably couples the jack 220 with the cable gripping device collar 210.

Several options for the method 800 follow. In one example, where the jack 220 and cable gripping device collar 210 are coupled together with the mechanical advantage coupling 226, moving the jack 220 and the cable gripping device 208 together includes inputting an input force, such as force input 410 shown in FIG. 4, to at least one of the jack 220 and the cable gripping device collar 210 (e.g., force may be input to either the jack 220 or cable gripping device collar 210 as long as one of the cable gripping device collar and jack are held immobile relative to the other). Moving the jack 220 and the cable gripping device 208 together further includes transmitting an output force, such as output force 412 shown in FIG. 4, to the cable gripping device 208 from the jack 220. The output force 412 is greater than the input force 410 because of the mechanical advantage coupling 226. In another example, inputting the input force 410 includes rotating at least one of the jack 220 and the cable gripping device collar 210 relative to the other of the cable gripping device collar and the jack. Further, outputting the output force 412 includes moving the jack 220 along a cable gripping device longitudinal axis, such as the axis 508 shown in FIGS. 5, 6 and 7, toward the cable gripping device 208. In yet another example, the vector of the input force 410 is not coincident with the vector of the output force 412 (see respective arrows shown in FIG. 4). For instance, the force input 410 is provided in a rotational arcuate manner and the output force 412 is provided in a longitudinal manner along the cable gripping device collar longitudinal axis 508.

In another example, the method 800 includes restraining lateral movement of the jack 220 relative to the cable gripping device collar longitudinal axis 508. Lateral movement of the jack 220 is restrained by engagement of the cable gripping device collar 210 around the jack 220. For instance, the engagement of the cable gripping device collar 210 around the jack 220 ensure that force input to the jack 220 results in longitudinally movement of the jack 220 toward the cable gripping device 208 (e.g., with a threaded mechanical advantage coupling, geared mechanical advantage coupling, rack and gear mechanical advantage coupling and the like). In still another example, the method 800 further includes sliding a pipe splitter such as pipe splitter 116 proximally where the pipe splitter 116 is coupled with a cable gripping device collar proximal end 502. Sliding the pipe splitter 116 relative to the cable gripping device collar 210 reveals at least a portion of the jack 220 (e.g., jack proximal end 402 having tool receiving surfaces 406).

Figure 9:
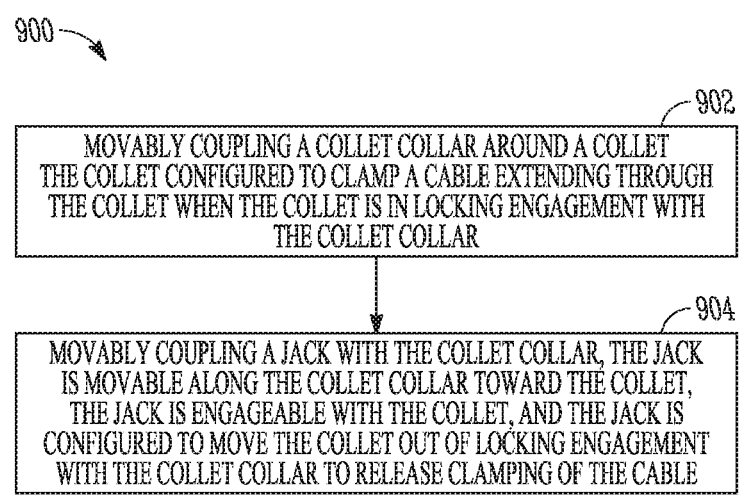
FIG. 9 Is a block diagram showing one example of a method of making the cable locking assembly.

FIG. 9 shows one example of a method 900 for making a cable locking assembly, such as cable locking assembly 118 shown in FIGS. 2A, 2B. Where applicable reference is made to elements shown in FIGS. 1A through 7 of the pipe splitting assembly 102. At 902, a cable gripping device collar 210 is movably coupled around a cable gripping device 208. The cable gripping device 208 is configured to clamp a cable, such as cable 110, extending through the cable gripping device 208 when the cable gripping device is in locking engagement with the cable gripping device collar. In one example, the locking engagement includes an interference fit between the cable gripping device 208 and the cable gripping device collar 210. Optionally, the cable gripping device 208 is locked with the cable gripping device collar 210 by an interference fit that immobilizes the cable gripping device 208 and cable gripping device collar 210 relative to the cable 110 and prevents longitudinal movement of the cable gripping device 208 relative to the cable gripping device collar 210. At 904, a jack such as jack 220 is movably coupled with the cable gripping device collar 210. The jack 220 is movable on the cable gripping device collar 210 toward the cable gripping device 208 as shown in FIGS. 2B, 6, and 7. The jack 220 is engagable with the cable gripping device 208, and the jack 220 is configured to move the cable gripping device 208 out of locking engagement (e.g., interference fit) with the cable gripping device collar 210 to release clamping of the cable 110. As previously described, in one example, the jack 220 is movably coupled with the cable gripping device collar 210 by a mechanical advantage couple 226. The mechanical advantage coupling 226 allows the user to input a force, such as force input 410 shown in FIG. 4, and generate a force output 412 greater than the force input 410. The force output 412 is transmitted to the cable gripping device 208 when it is desired to uncouple the cable gripping device 208 from the cable 110 and disassemble the pipe assembly 102 from the cable 110.

Several options for the method 900 include the following. In one example the method 900 includes coupling a pipe puller 212 with the cable gripping device collar 210. In another example, the cable gripping device collar 210, cable gripping device 208, jack 220 and a pipe splitter 116 are coupled with the cable 110 by passing the cable 110 through cable passages 204, 222, 225. In yet another example, the cable gripping device 208 is coupled around the cable 110 with two or more cable gripping device pieces 304, 306, 308. For instance, the cable gripping device pieces 304, 306, 308 are held around the cable 110 with incident contact generated by an elastic band 313 held within an elastic band groove 312 extending around the cable gripping device 208 (e.g., over the cable gripping device pieces 304, 306, 308).

Figure 10:
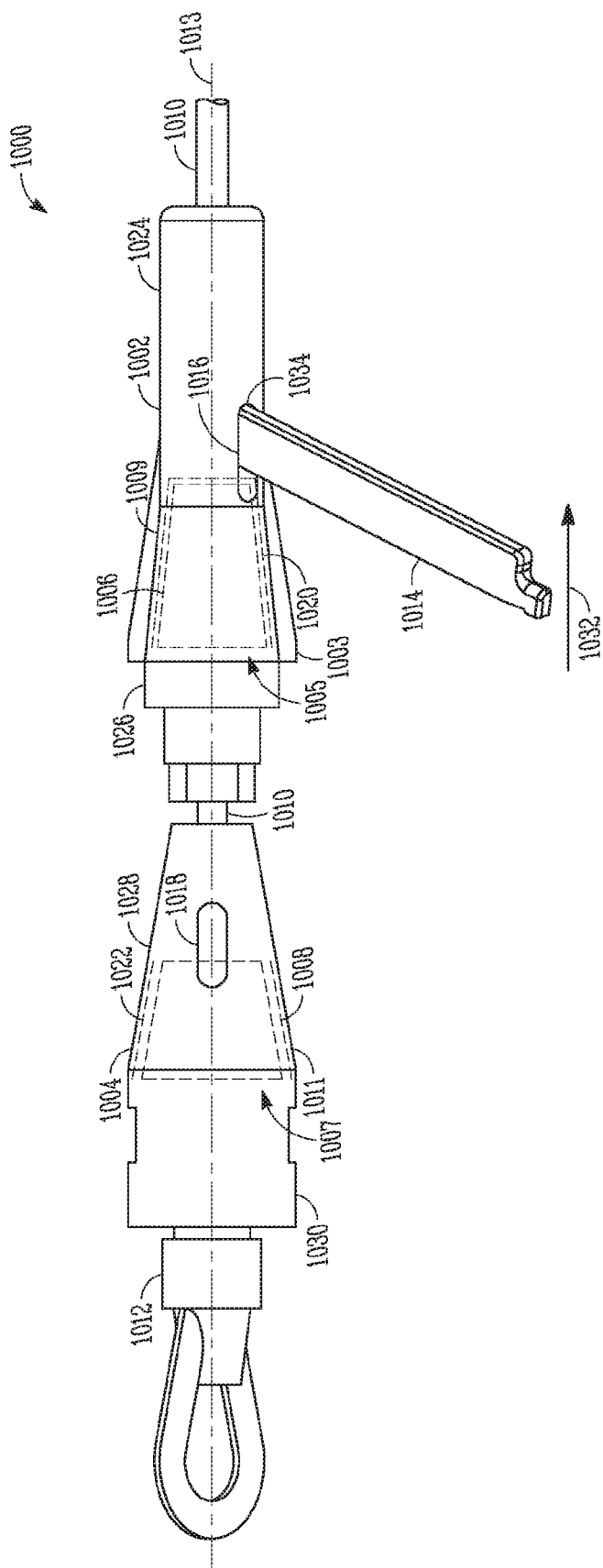
FIG. 10 Is a side view of another example of a pipe splitting assembly including a plurality of cable locking assemblies.

Referring now to FIG. 10, another example of a pipe splitting assembly 1000 is shown. The pipe splitting assembly 1000 is similar in some respects to the pipe splitting assembly 102 described herein. The pipe splitting assembly 1000 includes a pipe splitter 1002. The pipe splitter 1002 has one or more cutting surfaces 1003 sized and shaped to engage with the inner wall of an existing pipe and break the existing pipe. In one example, the pipe splitter 1002 includes a frusto-conical expanding surface 1009 at the pipe splitter distal end 1026. As shown, the pipe splitter proximal end 1024 has a substantially cylindrical surface that surrounds the cable 1010 extending therethrough.

The pipe splitting assembly 1000 further includes, in one example, an expander 1004 positioned near the pipe splitter distal end 1026. The cable 1010 extends through the expander 1004 to the cable distal end 1012. The expander 1004 includes an expanding surface 1011 near the expander proximal end 1028. In one example, the expander 1004 includes a substantially cylindrical surface near the expander distal end 1030.

As shown in FIG. 10, each of the pipe splitter 1002 and the expander 1004 includes a first cable locking assembly 1005 and a second cable locking assembly 1007, respectively. The first cable locking assembly 1005 includes a first cable gripping device 1006 (shown in phantom lines) that is similar in at least some respects to the cable gripping device 208 shown in FIGS. 2A, B. The first cable gripping device 1006 is engaged against a first gripping device receiving surface 1020 extending along an inner surface of the pipe splitter 1002. The first gripping device 1006 and the first gripping device receiving surface 1020 have complementary geometries that facilitate fitting of the first gripping device 1006 within the first gripping device receiving surface 1020. Tight engagement between the first gripping device 1006 and the first gripping device receiving surface 1020 locks the first gripping device 1006 to the pipe splitter 1002 and locks the first gripping device to the cable 1010 thereby preventing movement of the cable relative to the pipe splitter 1002.

In a similar manner, the expander 1004 includes a second cable locking assembly 1007 having a second cable gripping device 1008. The second cable gripping device 1008 is sized and shaped to fit within the expander 1004 along the second gripping device receiving surface 1022. Tight engagement between the second cable gripping device 1008 and the second cable gripping device receiving surface 1022 locks the second cable gripping device 1008 around the cable 1010 and immobilizes the cable 1010 relative to the expander 1004.

Each of the first and second cable locking assembly examples 1005, 1007 shown in FIG. 10 includes a jack opening (e.g., first and second jack openings 1016, 1018). The first and second jack openings 1016, 1018 are sized and shaped to receive an end of a jack tool, such as jack tool 1014 shown in FIG. 10, and further shown in FIGS. 13A, B. A jack engagement surface of the jack tool 1014 is configured to engage with the cable gripping devices 1006, 1008 when inserted through the openings 1016, 1018. Jack tool movement along the direction shown at 1032 engages the jack engagement surface with the cable gripping devices 1006, 1008 and disengages the cable gripping devices from the first and second gripping device receiving surfaces 1020, 1022. Disengagement of the first and second cable gripping devices 1006, 1008 from the receiving surfaces 1020, 1022 allows the cable 1010 to slide relative to the pipe splitter 1002 and the expander 1004 allowing disassembly of the pipe splitting assembly 1000 without difficult and time-consuming effort by the user to otherwise break the engagements.

Figure 11:
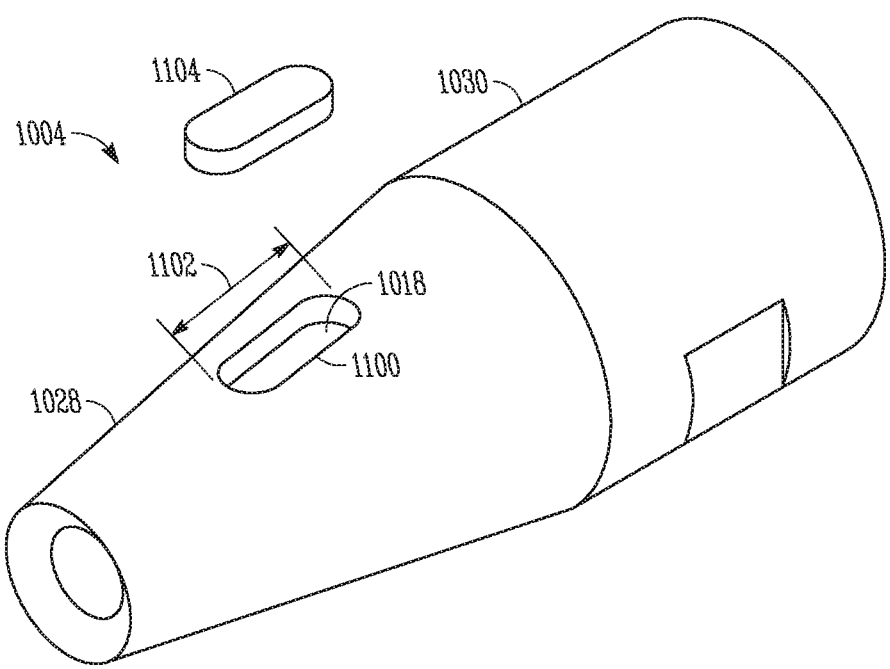
FIG. 11 is a perspective view of one example of an expander.
Figure 12:
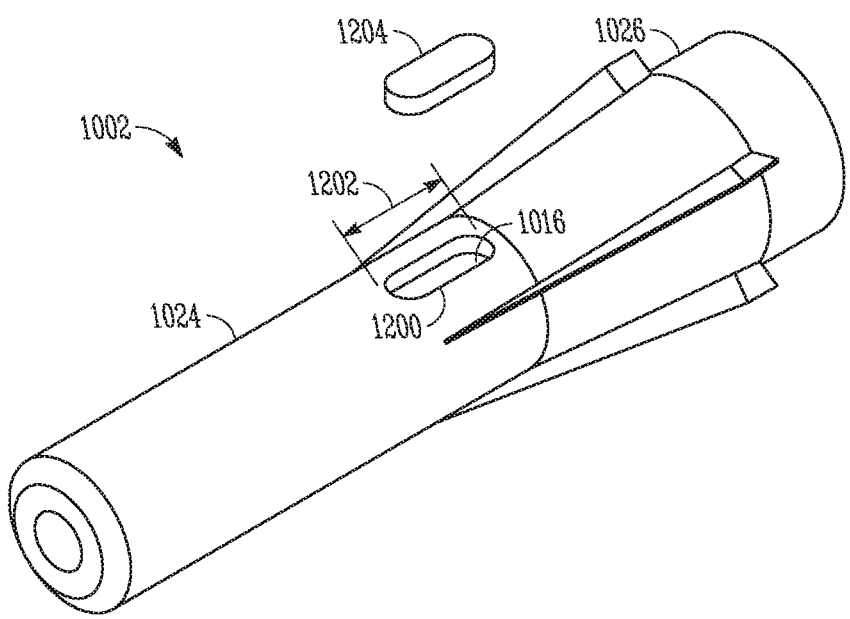
FIG. 12 Is a perspective view of one example of a pipe splitter.

One example of the expander 1004 is shown in FIG. 11. As previously described, the expander 1004 has a frusto-conical shape that tapers from the expander distal end 1030 toward the expander proximal end 1028. The second jack opening 1018 is shown in FIG. 11. Referring now to FIG. 12, one example of the pipe splitter 1002 is shown. The pipe splitter 1002 includes the first jack opening 1016. As described above, the jack openings 1016, 1018 allow access to the first and second cable gripping devices 1006, 1008 of the first and second cable locking assemblies 1005, 1007. The jack tool 1014 (FIG. 10) is fit through the openings 1016, 1018 to engage with and decouple the first and second cable gripping device 1006, 1008 from their respective first and second gripping device receiving surfaces 1020, 1022 (also shown in FIG. 10).

Referring now to FIGS. 11 and 12, the surfaces of the pipe splitter 1002 and the expander 1004 surrounding the openings 1016, 1018 are shown in greater detail. In one example, the openings 1016, 1018 have rounded ends, such as first and second fulcrum rests 1200, 1100 sized and shaped to receive the fulcrum of the jack tool 1014 (described below). The rounded configuration of the first and second fulcrum rests 1200, 1100 guides the jack tool 1014 during movement through the openings 1016, 1018 (shown in FIG. 10 by arrow 1032). The fulcrum rests 1100, 1200 direct the disengaging force transmitted by the jack tool 1014 along a pipe splitting assembly longitudinal axis 1013 into the first and second cable gripping devices 1006, 1008 without any component of force being directed away from the axis 1013. The full force supplied by mechanical advantage of the jack tool 1014 is thereby applied to cable gripping devices 1006, 1008 to more easily cause disengagement. Each of the first and second jack openings 1016, 1018 further includes a first and second jack opening travel distance 1202, 1102. The travel distances 1202, 1102 are configured to allow the jack tool 1014 to travel during rotation and disengage the first and second cable gripping devices 1006, 1008 from their respective receiving surfaces 1020, 1022.

Optionally, the pipe splitter 1002 and the expander 1004 include a first jack opening plug 1204 and a second jack opening plug 1104 sized and shaped to fit within the respective jack openings 1016, 1018. The plugs 1204, 1104 fill the openings and prevent the ingress of foreign material within the pipe splitting assembly 1000. For example, dirt, sludge and the like is substantially prevented from infiltrating the expander 1004 or pipe splitter 1002 preventing interference with the disengagement of the first and second cable gripping devices 1006, 1008 from the first and second gripping device receiving surfaces 1020, 1022. That is to say, the interior of the pipe splitter 1002 and expander 1004 are not filled with foreign matter that could interfere with rotation of the jack tool 1014. When the plugs 1204, 1104 are disposed within the first and second jack openings 1016, 1018, in one example, the plugs provide a flush surface to the pipe splitter and expander. Optionally, the plugs are constructed with the same or similar materials to the pipe splitter 1002 and expander 1004 (e.g., steel, cast iron and the like). In another option, the plugs 1204, 1104 are constructed with softer materials to assist with the removal of the plugs by deformation with a tool such as a screw driver. Such materials include, but are not limited to, composites, plastics, rubber and the like.

Figure 13A:
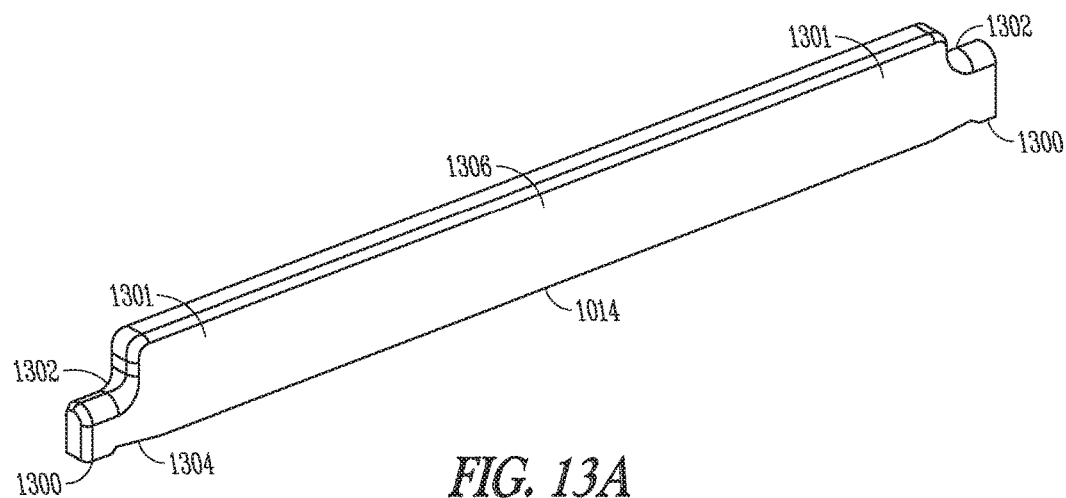
FIG. 13A Is a perspective view of one example of a jack tool.
Figure 13B:
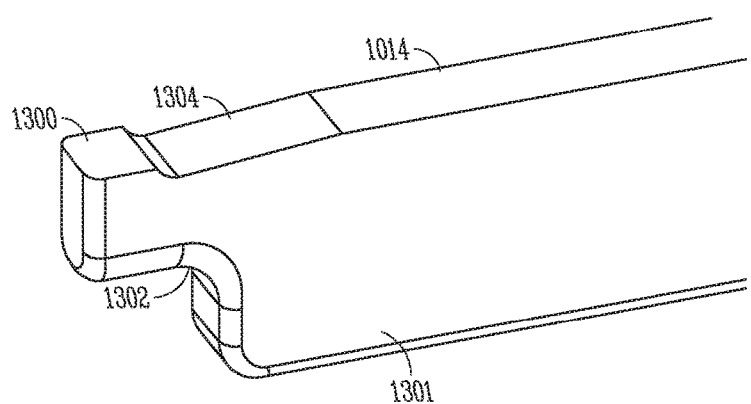
FIG. 13B Is a detailed perspective view of an end of the jack tool shown in FIG. 13A.

One example of the jack tool 1014 is shown in FIGS. 13A, B. FIG. 13B shows a detailed view of one jack tool end 1301. Referring to FIG. 13A, the jack tool 1014 includes a handle 1306. In the example shown, the jack tool 1014 includes jack engagement surfaces 1300 at one or both of the jack tool ends 1301. The jack engagement surfaces 1300, in one example, are substantially planar for flat engagement with the first and second cable gripping devices 1006, 1008. The flat engagement assists with directing disengagement forces along the pipe splitting assembly axis 1013 without components of force being directed away from the axis to lessen the disengagement forces. The jack tool 1014 further includes a jack fulcrum 1302 sized and shaped to engage with the fulcrum rests 1100, 1200 shown in FIGS. 11 and 12. Referring to FIGS. 13A, B, the jack fulcrum 1302 has a similar geometry to the fulcrum rests 1100, 1200 to create a joint 1034 (FIG. 10) between the jack tool 1014 and the fulcrum rests 1100, 1200. The rounded configuration of the fulcrum rests 1100, 1200 and the jack fulcrum 1302 guides the movement of the jack tool 1014 during rotation and assists in directing disengagement forces fully into the first and second cable gripping devices 1006, 1008.

In yet another example, the jack tool 1014 includes at least one jack elbow 1304 near the jack engagement surface 1300. As shown in FIGS. 13A, B, the jack elbow 1304, in one example is a scalloped portion of the jack tool 1014. The jack elbow 1304 allows the jack engagement surface 1300 to hook beneath the first and second gripping device receiving surfaces 1020, 1022 and allows the surface 1300 to engage with the first and second cable gripping devices 1006, 1008 without interference.

The above described pipe splitting assembly 1000 with the first and second cable locking assemblies 1005, 1007 allows for quick and easy disengagement of the pipe splitting assembly 1000 from the cable 1010. A user inserts the jack tool 1014 into at least one of the first and second jack openings 1016, 1018 and rotates the jack tool 1014 in the direction 1032. The jack tool 1014 rotates around the joint 1034 and the jack engagement surface 1300 engages with one of the first and second cable gripping devices 1006, 1008 and pushes the device out of locking engagement with the corresponding first or second gripping device receiving surface 1020, 1022. The mechanical advantage provided by the jack tool 1014 rotated at the fulcrum rests 1100, 1200 easily transmits enough force to break the locking engagement therebetween. The user does not thereby need heavy equipment or time consuming labor to break the engagement and disassemble the pipe splitting assembly 1000.

CONCLUSION

The pipe splitting assembly including the cable locking assembly described herein provides a strong coupling between a puller cable and the pipe splitting assembly, while allowing quick disengagement of the pipe splitting assembly from the cable locking assembly. The cable gripping device engages around the cable because of the interference fit between the cable gripping device and the cable gripping device collar. The tight interference fit locks the cable gripping device with the cable gripping device collar and thereby compresses the cable gripping device around the cable immobilizing the pipe splitting assembly along the cable for operation of a motorized puller.

The jack is movably coupled with the cable gripping device collar and engages with the cable gripping device when moved within the cable gripping device collar. The jack pushes the cable gripping device out of engagement with the cable gripping device collar to break the locking interference fit between the cable gripping device and the cable gripping device collar. The cable locking assembly is thereby able to tightly engage with the cable and provide reliable immobilization of the pipe splitting assembly along the cable while providing a mechanism that quickly releases the tight engagement between the cable and the cable locking assembly. Further, because the jack is coupled with the cable gripping device collar with a mechanical advantage coupling the user provides a force input that is multiplied as a force output to the cable gripping device. Because of the mechanical advantage coupling, a single user is able to disengage the locked cable gripping device from the cable gripping device collar with hand tools, such as wrenches. Power tools including air ratchets, hammers and the like are thereby unnecessary. Moreover, the jack is a compact device fully contained within the pipe splitting assembly. As shown, the jack is slidably coupled around the cable and moveably coupled within the cable gripping device collar. The jack is positioned within the cylindrical perimeter of the pipe splitting assembly and does not provide a bulky mechanism that extends outside of the assembly that could interfere with the pipe splitting operation.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A pipe splitting assembly, comprising:
    a gripping device collar;
    one or more tapered cable gripping pieces mating with a tapered inner surface of the gripping device collar;
    a pipe splitter having a passage to receive a cable, wherein the pipe splitter abuts the gripping device collar when in use; and
    an expander coupled behind the gripping device collar, wherein the expander is flexibly coupled to the gripping device collar.

2. The pipe splitting assembly of claim 1, further including a threaded jack configured to apply a force to the one or more tapered cable gripping pieces.

3. The pipe splitting assembly of claim 2, wherein the threaded jack includes flats to accept a wrench.

4. The pipe splitting assembly of claim 3, wherein the gripping device collar includes flats to accept a wrench.

5. The pipe splitting assembly of claim 1, wherein the pipe splitter includes a pair of blades.

6. A pipe splitting assembly, comprising:
    a leading pipe splitter, including:
    a first gripping device body;
    one or more first tapered cable gripping pieces mating with a tapered inner surface of the first gripping device body;
    a trailing pipe expander, flexibly coupled to, and spaced apart from the leading pipe splitter, including:
    a second gripping device body; and
    one or more second tapered cable gripping pieces mating with a tapered inner surface of the second gripping device body.

7. The pipe splitting assembly of claim 6, further including a pipe puller coupled behind the trailing pipe expander.

8. The pipe splitting assembly of claim 6, further including a threaded jack configured to apply a force to the one or more first tapered cable gripping pieces.

9. The pipe splitting assembly of claim 6, further including a threaded jack configured to apply a force to the one or more second tapered cable gripping pieces.

* * * * *